(12) United States Patent
Månsson et al.

(10) Patent No.: US 11,087,893 B2
(45) Date of Patent: Aug. 10, 2021

(54) NUCLEAR FUEL ASSEMBLY WITH BALANCING PLATE

(71) Applicant: Westinghouse Electric Sweden AB, Västerås (SE)

(72) Inventors: Markus Månsson, Västerås (SE); Patrik Andersson, Västerås (SE)

(73) Assignee: Westinghouse Electric Sweden AB, Västerås (SE)

( * ) Notice: Subject to any disclaimer, the term of this patent is extended or adjusted under 35 U.S.C. 154(b) by 519 days.

(21) Appl. No.: 16/062,810

(22) PCT Filed: Dec. 2, 2016

(86) PCT No.: PCT/EP2016/079654
§ 371 (c)(1),
(2) Date: Jun. 15, 2018

(87) PCT Pub. No.: WO2017/102388
PCT Pub. Date: Jun. 22, 2017

(65) Prior Publication Data
US 2020/0194133 A1 Jun. 18, 2020

(30) Foreign Application Priority Data
Dec. 18, 2015 (EP) .................................. 15201167

(51) Int. Cl.
*G21C 3/322* (2006.01)
*G21C 3/334* (2006.01)
*G21C 3/32* (2006.01)

(52) U.S. Cl.
CPC ........... *G21C 3/3225* (2019.01); *G21C 3/334* (2013.01); *G21C 3/32* (2013.01)

(58) Field of Classification Search
CPC ........... G21C 3/32; G21C 3/225; G21C 3/334
See application file for complete search history.

(56) References Cited

U.S. PATENT DOCUMENTS

| | | | |
|---|---|---|---|
| 4,038,137 A * | 7/1977 | Pugh | G21C 3/334 |
| | | | 376/440 |
| 4,219,386 A | 8/1980 | Osborne et al. | |
| | (Continued) | | |

FOREIGN PATENT DOCUMENTS

| | | | |
|---|---|---|---|
| DE | 4327002 A1 * | 2/1995 | ............... G21C 3/32 |

OTHER PUBLICATIONS

International Search Report issued in corresponding application No. PCT/EP2016/079654, dated Feb. 23, 2017, pp. 1-3.

*Primary Examiner* — Lily C Garner
(74) *Attorney, Agent, or Firm* — Murtha Cullina LLP

(57) ABSTRACT

A fuel assembly for a boiling water reactor having fuel rods, two or three water rods, a tie plate, spacers, a handle, and a joint arrangement. The joint arrangement is configured to transfer a vertical lifting force from the handle to the water rods. The joint arrangement includes a balancing element arranged between the water rods and the handle. The joint arrangement includes a first joint arranged between the balancing element and the handle and a set of second joints arranged between a respective one of said water rods and said balancing element. The first joint and the set of second joints are configured to allow a rotational movement of said balancing element in relation to said handle as well as in relation to said water rods in order to balance lifting forces in the water rods.

14 Claims, 6 Drawing Sheets

(56) References Cited

U.S. PATENT DOCUMENTS

| | | | | |
|---|---|---|---|---|
| 4,632,804 | A | * | 12/1986 | Wallander ............ G21C 3/3305 376/444 |
| 4,664,875 | A | * | 5/1987 | Shallenberger ........ G21C 3/334 376/261 |
| 4,699,761 | A | * | 10/1987 | Gjertsen ................ G21C 3/334 376/446 |
| 4,707,326 | A | * | 11/1987 | Wilson ................... G21C 3/334 376/261 |
| 4,895,697 | A | * | 1/1990 | Andersson ............... G21C 3/32 376/434 |
| 5,319,691 | A | * | 6/1994 | Peterson ................ G21C 3/334 376/446 |
| 5,339,342 | A | * | 8/1994 | Meier .................... G21C 3/324 376/446 |
| 5,461,647 | A | * | 10/1995 | Clark .................... G21C 3/334 376/260 |
| 5,481,579 | A | | 1/1996 | Johansson et al. |
| 5,627,866 | A | * | 5/1997 | Dunlap .................... G21C 3/14 376/446 |
| 5,646,973 | A | * | 7/1997 | Proebstle ............ G21C 3/3315 376/434 |
| 5,671,261 | A | * | 9/1997 | Frederickson ......... G21C 3/334 376/446 |
| 5,896,436 | A | * | 4/1999 | Gronlund ............... G21C 3/334 376/446 |
| 6,275,557 | B2 | * | 8/2001 | Nylund ................... G21C 3/328 376/433 |
| 8,599,995 | B2 | * | 12/2013 | DeFilippis ............. G21C 3/322 376/440 |
| 9,393,680 | B2 | * | 7/2016 | Cocke .................... G21C 19/20 |

* cited by examiner

NUCLEAR FUEL ASSEMBLY WITH BALANCING PLATE

TECHNICAL FIELD

The invention relates to fuel assemblies for nuclear reactors, especially boiling water reactors, BWR. More specifically, the invention relates to fuel assemblies provided with a handle suitable for lifting the fuel assembly.

BACKGROUND AND PRIOR ART

In known constructions of fuel assemblies for nuclear reactors, the fuel rods are supported by lower and upper tie plates. In some fuel assemblies, the upper and lower tie plates are connected by means of tie rods. The upper tie plate may be attached to a handle used for lifting the fuel bundle of the fuel assembly, wherein the tie rods transfer lifting forces between the lower and upper tie plate.

In fuel assemblies provided with water rods, these water rods may be used for transferring lifting forces. Typically the water rods are arranged in the fuel assembly among the fuel rods, and these water rods are secured to the upper and lower tie plates and may be utilized for transferring the lifting forces between the lower and upper tie plates. In this way the water rods are used to carry the fuel rods that are supported by for example the lower tie plate, or by spacers arranged between the lower and upper tie plate, which spacers are connected to the water rods as well as to the fuel rods.

U.S. Pat. No. 5,646,973 illustrates a fuel assemblies for a boiling water reactors. The fuel assembly (10 in FIG. 1 of U.S. Pat. No. 5,646,973) comprises a channel (22 in FIG. 1 of U.S. Pat. No. 5,646,973), fuel rods (12 in FIG. 1 of U.S. Pat. No. 5,646,973) and a water rod (18 in FIG. 1 of U.S. Pat. No. 5,646,973). The fuel rods and water rod are arranged inside the channel. The fuel assembly further comprises spacers (72 in FIG. 2, 172 in FIG. 4, of U.S. Pat. No. 5,646,973) fastened to the water rod. The spacers seemingly holds the fuel rods in position by frictional force. The fuel rods may move slightly by overcoming the frictional force when they expand during operation. The water rod is connected to a lower tie plate (16 in FIG. 1 of U.S. Pat. No. 5,646,973) at the bottom and to an upper tie plate (14 in FIG. 1 of U.S. Pat. No. 5,646,973) at the top. The uppermost section of the water rod is connected to the handle by means the upper tie plate and a nuts (40 in FIG. 1 of U.S. Pat. No. 5,646,973) that attach the water rod to the upper tie plate. FIG. 6 of U.S. Pat. No. 5,646,973 shows a fuel assembly having two water rods (210, 212), but no upper tie plate. The connection between the handle (236 in FIG. 6 of U.S. Pat. No. 5,646,973) and the water rods (210, 212 in FIG. 6 of U.S. Pat. No. 5,646,973) are pre-stressed by means of springs (266, 268 FIG. 6 of U.S. Pat. No. 5,646,973) and stops (see detail 228 in FIG. 9 of U.S. Pat. No. 5,646,973) on each water rod. Each of the different handles described in the figures of U.S. Pat. No. 5,646,973 is provided to lift the water rods, the fuel rods, the lower tie plate and the spacers.

The handle may be secured to the channel to also lift the channel (see e.g. FIG. 2 of U.S. Pat. No. 5,646,973).

Alternatively the channel of a fuel assembly may be secured to the bottom of the fuel assembly and the handle will lift fuel rods, water rods and spacers of the fuel assembly out of the channel.

The fuel assembly of FIG. 6 of U.S. Pat. No. 5,646,973 comprises two water rods. During operation, the water rods may expand/grow slightly (due to thermal/nuclear growth) and one water rod may grow differently than the other. This may result in an imbalance of the load carried by the water rods during lifting, so that one water rod will carry a higher load than the other water rod, and may also result in a slightly tilted assembly during handling.

U.S. Pat. No. 5,481,579 describes a construction for lifting a fuel bundle by means of a pair of water rods of the fuel bundle. U.S. Pat. No. 5,481,579 describes a connection between a lifting handle and the two water rods, which connection is configured to even out differences between the lifting forces of the two water rods, especially in the case the two water rods have grown a different amount during operation of the nuclear reactor (see column 6 line 62-column 7 line 10, claims 3-4 and column 5 line 12-50 in U.S. Pat. No. 5,481,579).

This construction for evening out the lifting forces includes a latching mechanism comprising a "latch bar" and a "double boss", wherein the latch bar (see detail 76 in U.S. Pat. No. 5,481,579) can be angled in relation to a double boss (see detail 38 in U.S. Pat. No. 5,481,579), which double boss is arranged at an upper portion (see detail 68 in U.S. Pat. No. 5,481,579) of each of the two water rods (see e.g. detail 76 in FIGS. 6A and 8A, and details 38 and 68 in FIG. 8A of U.S. Pat. No. 5,481,579). According to U.S. Pat. No. 5,471,579, the double boss is connected to an upper tie plate, and the latch bar is connected to the upper portion of the water rods and rests on the double boss. The latch bar is provided with an elongated rib (see detail 106 in U.S. Pat. No. 5,471,579) by means of which the latch bar can rotate relative the double boss.

Thus, U.S. Pat. No. 5,481,579 discloses a fuel assembly having a handle and a pair of water rods, which fuel assembly can be lifted by means of the water rods transferring a lifting force to the handle, which fuel assembly further comprises a mechanism for evening out the difference between the lifting forces of the two water rods.

The latching mechanism of U.S. Pat. No. 5,481,579 is quite complicated and is only adapted for lifting a pair of water rods. U.S. Pat. No. 5,481,579 gives no example for fuel assemblies having three water rods.

SUMMARY OF THE INVENTION

An aim of the invention is to provide an alternative construction for evening out lifting forces in water rods of a fuel assembly, and to overcome, or at least alleviate, the problems of the prior art.

An aim is also to make it possible to provide a simple and secure construction for evening out the differences of said lifting forces, and consequently avoiding handling risks due to slight tilting of the fuel assembly during lifting operations.

According to a first aspect, the invention concerns a fuel assembly that comprises:

fuel rods;

two or three water rods;

a tie plate for supporting said two or three water rods, wherein said two or three water rods are secured to the tie plate;

one or more spacers configured to support said fuel rods and said two or three water rods;

a handle secured to the water rods at a respective top end of each of the water rods, and a joint arrangement.

Especially, in accordance with the first aspect of the invention, the handle is secured to said two or three water rods by means of the joint arrangement, and the joint arrangement is configured to transfer a vertical lifting force from the handle to said two or three water rods. The joint arrangement comprises a balancing element arranged between said two or three water rods and the handle. Especially, the joint arrangement comprises a first joint that is arranged between the balancing element and the handle, and a set of second joints, where each second joint of the set of second joints is arranged between a respective one of said two or three water rods and said balancing element. The first joint and said set of second joints are configured to allow a rotational movement of said balancing element in relation to said handle as well as in relation to said two or three water rods. Said first joint and each one of said second joints comprise a pair of spherically rounded joint surfaces.

The spherical roundness of the first and second joint surfaces are well suited for transfer of lifting forces and also allows rotational movement.

In an embodiment, said first joint being centrally arranged in relation to the second joints.

In an embodiment, said pair of spherically rounded joint surfaces of said first joint comprises one spherically rounded joint surface on the handle and one spherically rounded joint surface on the balancing element. The spherically rounded joint surfaces of said pair of spherically rounded joint surfaces of the first joint are arranged in contact with each other.

In an embodiment, the first joint comprises a distance section configured to provide a clearance for rotation of the balancing element in relation to the handle.

In an embodiment, a respective fastener is secured to the top portion of each water rod and each of said pairs of spherically rounded joint surfaces of said second joints comprises one spherically rounded joint surface on the fastener and one spherically rounded surface on the balancing element, so that the balancing element comprises one spherically rounded joint surface for each fastener. The spherically rounded joint surfaces of each of said pairs of spherically rounded joint surfaces of the set of second joints are arranged in contact with each other.

In an embodiment, each respective fastener comprises a nut, wherein a bottom side of each nut comprises a respective one of the spherically rounded joint surfaces of the set of second joints.

In an embodiment, the balancing element comprises two or three through-going holes, one for each water rod, wherein each one of said two or three water rods extends through one of the through-going holes so that one water rod extends through each through-going hole. Each of said through-going holes is configured with an internal diameter that provides a clearance for the respective water rod to thereby allow rotational movement of the balancing element in relation to each water rod.

The joint arrangement of the fuel assembly of the invention is suitable for fuel assemblies having two or three water rods, i.e. more than one water rod and less than four water rods.

In an embodiment the number of said two or three water rods are three water rods, but not more than three, i.e. more than two and less than four.

In another embodiment, the number of said two or three water rods are two water rods, but not more than two i.e. more than one and less than three.

In an embodiment, the balancing element consists of a single element, said single element being provided with said spherically rounded surface of the first joint on its bottom side, and being provided with said spherically rounded surfaces of the second joint on its top side.

In an embodiment, said single element is a plate-like element.

In an embodiment said balancing element is arranged to rotate upon experiencing mutually different vertical forces from the water rods during lifting. The handle and the water rods, however, remain aligned with each other and do not rotate.

The fuel assembly may be configured to be lifted together with a channel, or alternatively out of a channel. Thus, in an embodiment, the fuel bundle is configured to be arranged inside a channel, and wherein the tie plate, the spacer, the fuel rods and the water rods are configured for being lifted out of the channel. Thus, in an alternative embodiment, the fuel assembly further comprises a channel, and the tie plate, the spacer, the fuel rods and the water rods are arranged inside the channel, and the handle is connected to the channel and the tie plate, the spacer, the fuel rods and the water rods are configured for being lifted together with the channel.

BRIEF DESCRIPTION OF THE DRAWINGS

The present invention will now be explained more closely through a description of various embodiments and with reference to the attached drawings.

DETAILED DESCRIPTION

The invention is suitable for a fuel assembly of any of the types illustrated in the initially described prior documents U.S. Pat. Nos. 5,646,973 and 5,471,579, however the invention has been provided with means for connecting a handle to the water rods that provide a modification compared to the fuel assembly of prior art. An embodiment of the fuel assembly 1 of the invention is illustrated in FIG. 1, which shows a longitudinal view of a fuel assembly.

Figure 1:
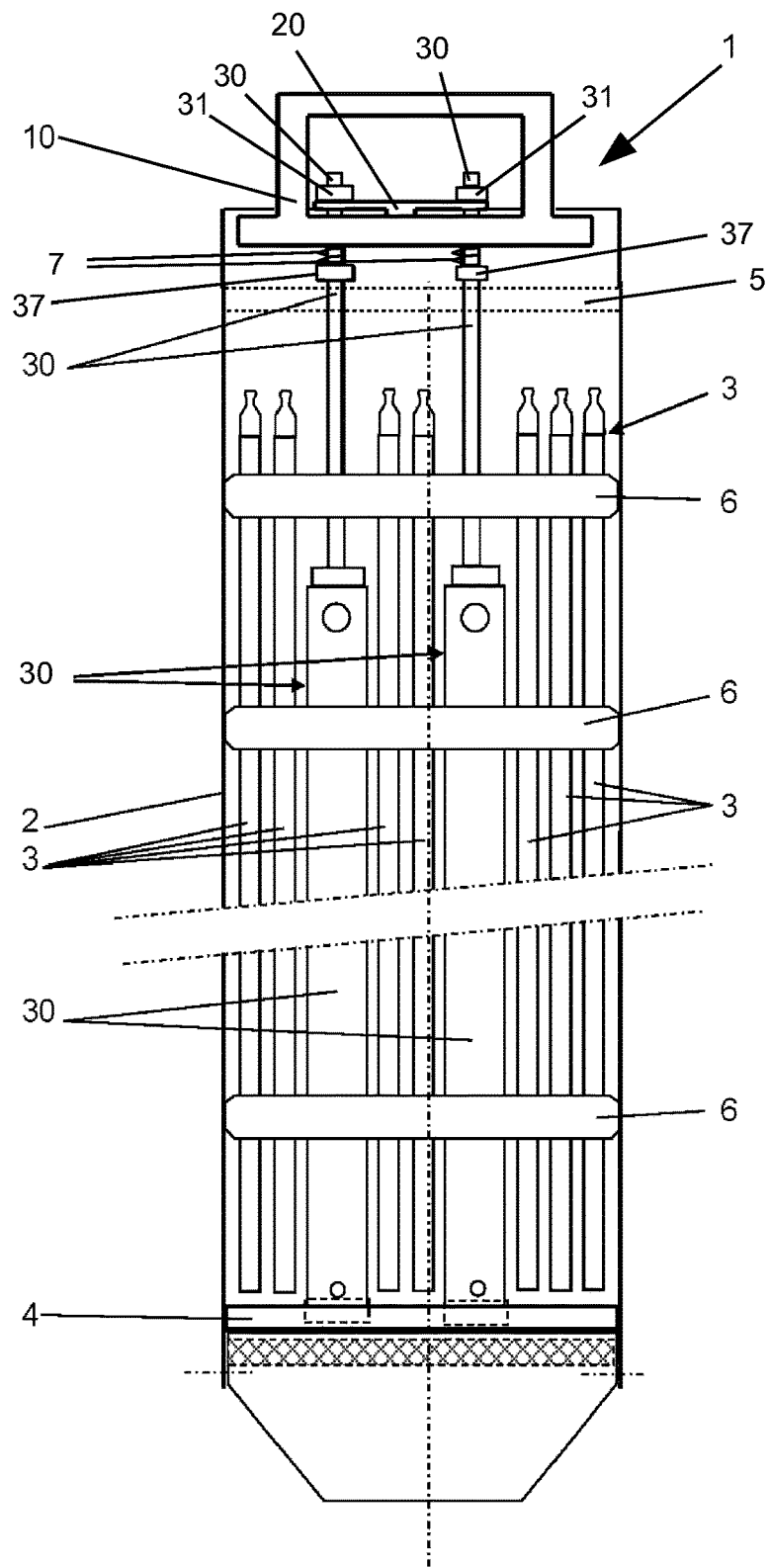
FIG. 1 illustrates a longitudinal section of a fuel assembly according to an embodiment of the invention.

The fuel assembly of FIG. 1 comprises two water rods 30. The fuel assembly 1 of the invention comprises at least two water rods 30 connected to the handle 10. Preferably, three water rods 30 are connected to the handle 10.

FIG. 1 illustrates an embodiment of a fuel assembly 1 for a boiling water reactor in accordance with the invention. The fuel assembly 1 is surrounded by a channel 2 and comprises fuel rods 3 and water rods 30. The fuel rods 3 and water rods 30 are arranged inside the channel 2. The fuel assembly 1 further comprises spacers 6 connected to the water rods 30. The spacers 6 also holds the fuel rods 3 in position by frictional force. The fuel rods 3 are able to move slightly by overcoming the frictional force when they expand during operation. The water rods 30 are secured to a tie plate 4, such as a lower tie plate, at the bottom and to a handle 10 at the top. The uppermost section of each water rod 30 is preferably solid and this section is connected to the handle 10, by means nuts 31 that are pre-stressed by means of springs 7 and stops 37. The fuel assembly may also include an upper tie plate 5 that connects the top portions of the water rods 30 to each other, as illustrated by dotted lines. The handle 10 is provided to lift the water rods 30, the fuel rods 3, the tie plate 4 and the spacers 6.

The handle 10 may also be secured to the channel 2 to also lift the channel 2. Alternatively the channel 2 is secured to the bottom of the fuel assembly and the handle 10 will lift the fuel rods 3, water rods 30, tie plate 4 and spacers 6 out of the channel 2.

An important feature of the embodiment of FIG. 1 is the connection of the handle 10 to the water rods 30. The handle 10 is connected to the water rods 30 by means of a balancing element 20, arranged between fasteners, e.g. a nut 31 at the top section of each water rod 30. The balancing element 20 is configured to transfer a lifting force between the water rods 30 and the handle 10. The balancing element 20 rests on the handle 10 and is fastened to the water rods 30 by means of the illustrated nuts 31. Springs 7 are arranged on the water rods 30 to pre-stress the balancing element 20 to contact with the nuts 31 and the handle 10. The springs 7 rests on stops 37 arranged on the water rods 30, below the handle 10, which stops 37 may be nuts threaded to the upper portion of the water rods 30. Preferably, the nuts are arranged above the upper tie plate 5 in case the fuel assembly 1 includes an upper tie plate 5.

Figure 2:
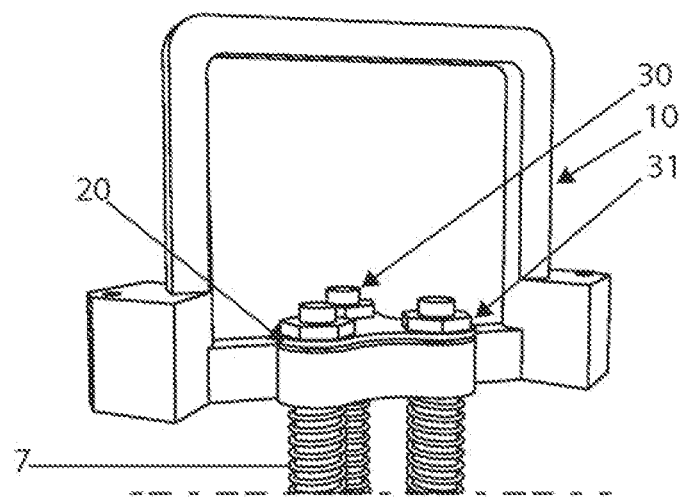
FIG. 2 illustrates an embodiment of a connection of a handle to water rods by means of a balancing element.

In more detail, FIG. 2 (upper figure) illustrates a handle 10 connected to the water rods 30 via the balancing element 20. The water rods 30 are secured to the balancing element 20 by means of fasteners 31, exemplified as nuts 31. A first joint (13 in FIG. 5) is provided between the handle 10 and the balancing element 20. A set of second joints (33 in FIG. 5) is provided between the water rods 30 and the balancing element 20.

Figure 2A:
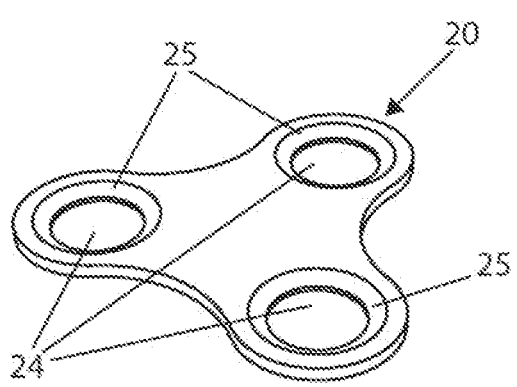
FIG. 2A, 2B illustrates an embodiment of a balancing element provided for three water rods in more detail.
Figure 2B:
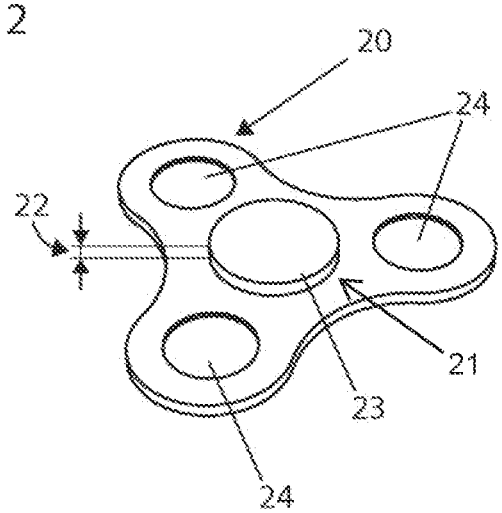
Figure 2C:
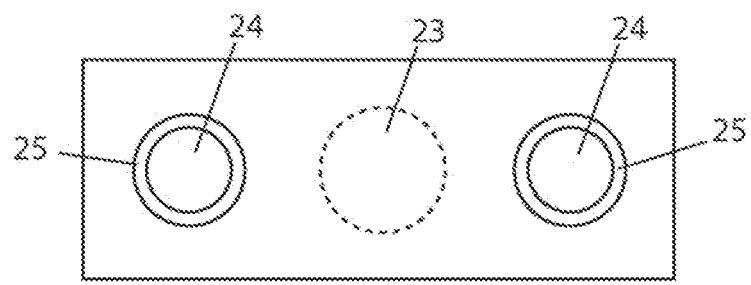
FIG. 2C illustrates an embodiment of a balancing element provided for two water rods.

The balancing element 20 is illustrated in detail below the handle 10 (FIG. 2A, 2B, 2C). FIGS. 2A and 2B illustrates a balancing element 20 for a fuel assembly 1 that comprises three water rods 30, whereas FIG. 2C illustrates a balancing element 20 for a fuel assembly 1 comprising two water rods 30.

Figure 4:
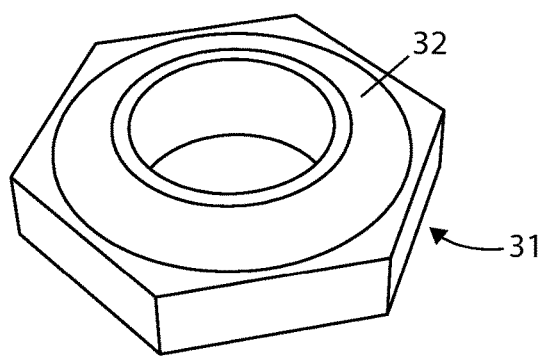
FIG. 4 illustrates an embodiment of a fastener for attaching a balancing element to a water rod.

An upper side of the balancing element 20, see FIG. 2A, comprises three through-going holes 24. Each through-going hole 24 is provided for receiving a top section of one of the water rods 30. Each through-going hole 24 is provided with a rounded, especially spherically rounded, and concave, joint surface 25 for the corresponding fastener/nut 31. Each spherically rounded joint surface 25, of the through-going holes 24, is provided along the circular circumference of the through-going hole 24. The through-going holes 24 are slightly larger than the diameter of the top section of the water rods 30 in order to allow a slight movement of the balancing element 20 in relation to the water rods 30. A downward side of the nuts 31 are illustrated in FIG. 4 and comprises a spherically rounded, and convex, joint surfaces 32 corresponding to the joint surfaces 25 of the balancing element 20, in FIG. 2A.

A downward side of the balancing element 20 of FIG. 2A, which is illustrated in FIG. 2B, is provided with a protrusion 21. The protrusion 21 is centrally arranged in relation to the through-going holes 24. The protrusion 21 comprises a distance section 22 and a spherically rounded joint surface 23. The rounded joint surface 23 is intended for joining with a corresponding surface (11 in FIG. 3) of the handle 10. The illustrated joint surface 23 is concave but may be convex provided the corresponding joint surface (11 in FIG. 3) of the handle 10 is concave.

FIG. 2C illustrates an embodiment of a balancing element 20 for connecting to two water rods 30. The balancing element 20 of FIG. 2C comprises two throughgoing holes 24, one for each water rod 30. Each one of the two throughgoing holes 24 is provide with a rounded surface 25, of the second joints 33, along its circumference. The downward side of the balancing element 20 is provided with the spherically rounded surface 23, as is illustrated by a dashed line, of the first joint 13 to the handle 10. The first joint 13 with spherical surface 23, of FIGS. 2B and 2C, is centrally arranged, geometrically, in relation to the set of second joints 33 with surfaces 25.

Figure 3:
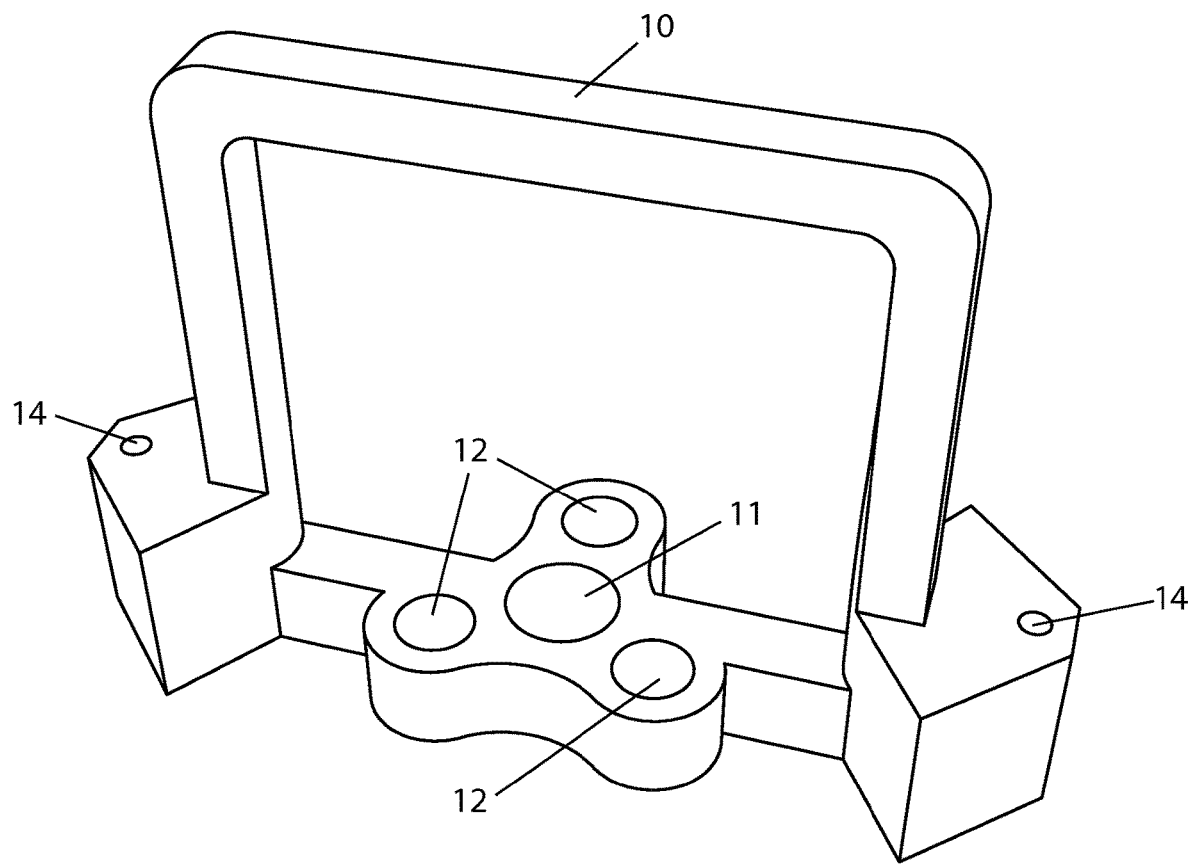
FIG. 3 illustrates an embodiment of a handle for a fuel assembly in more detail.

FIG. 3 illustrates the handle 10. The handle 10 comprises a spherically rounded joint surface 11 for receiving the joint surface 23 (of the bottom) of the balancing element 20, in FIG. 2B. The spherically rounded joint surface 11 faces upwards.

The handle 10 is provided with through-going holes 12 for receiving the upper ends of the water rods 30. The handle 10 may also be provided with means, such as holes 14, for connecting the handle 10 to the channel 2.

Figure 5:
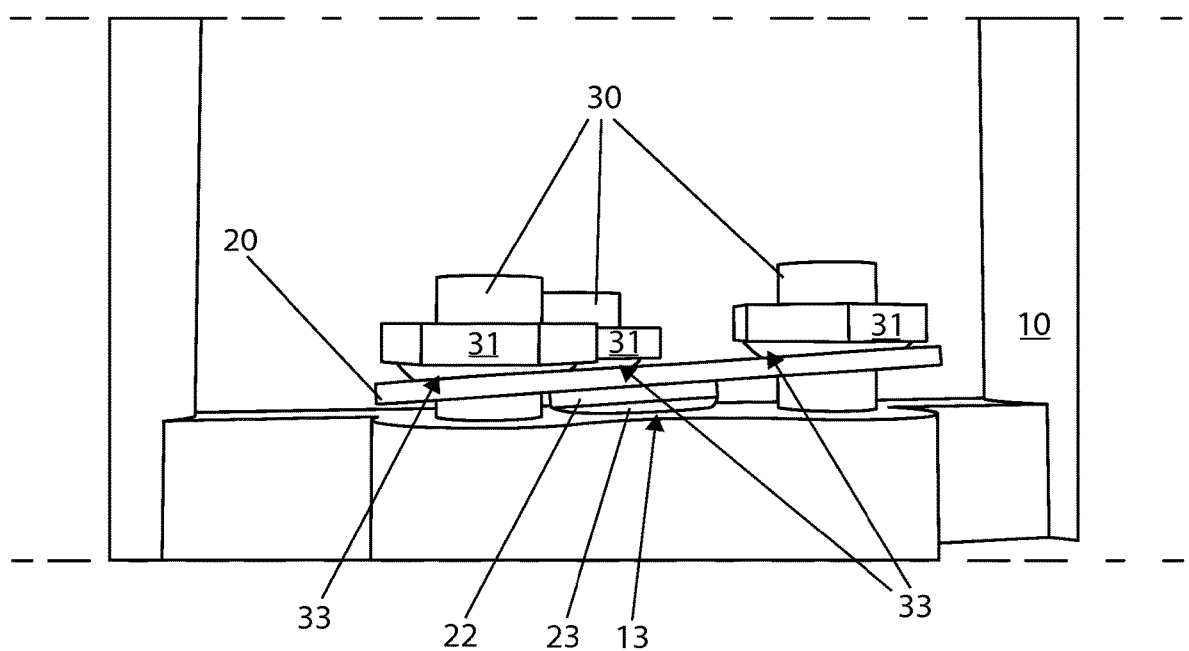
FIG. 5 is a close detail illustration of a balancing element during lifting.

FIG. 5 illustrates the joint arrangement between the handle 10 and the water rods 30 during lifting. In FIG. 5, one of the water rods 30 is longer than the other two water rods 30. The balancing element 20 is allowed to rotate slightly to even out the imbalance of the lifting force transferred from the handle 10 to the three water rods 30. The spherical surfaces 25, 32 of the joint 33 between the nuts 31 and the balancing element 20 allow the balancing element 20 to rotate in relation to the water rods 30. The spherical surfaces 23, 11 of the joint 13 between the handle 10 and the balancing element 20 allow the balancing element 20 to rotate in relation to the handle 10. The distance section 22 of the protrusion 21 provides space for the rotation.

During lifting, the balancing element 20 is arranged to transfer the vertical lifting forces between the handle 10 and the water rods 30. The balancing element 20 is arranged so that it may rotate by means of the spherical joint surfaces, of the first 13 and second joints 33, in order to equal out the differences between the lifting forces experienced by the water rods 30. When lifting is initiated, the water rods 30 may for example exert different forces to the balancing element 20, due to their 30 difference in length. The different forces will rotate the balancing element 20. The balancing element 20 is pivoted by the interaction between the joint surfaces 11, 23 of the joint 13 between the balancing element 20 and the handle 10, and by the joint surfaces 25, 32 of the second joint 33 between the balancing element 20 and the water rods 30. Thus, the balancing element 20 will rotate until the forces from the water rods 30 have been equalized.

Figure 6:
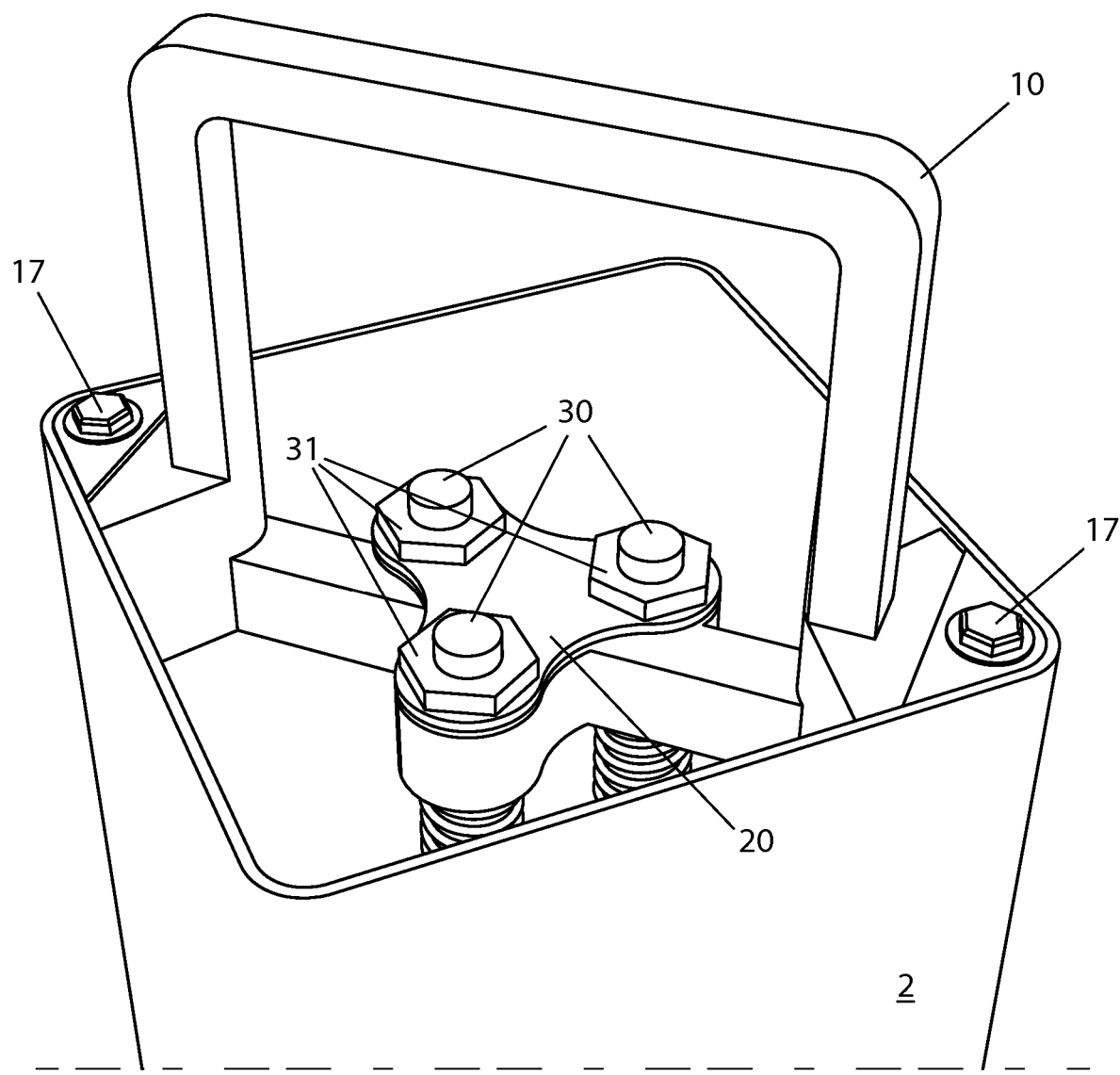
FIG. 6 illustrates a top section of a fuel assembly according to one embodiment.
Figure 7:
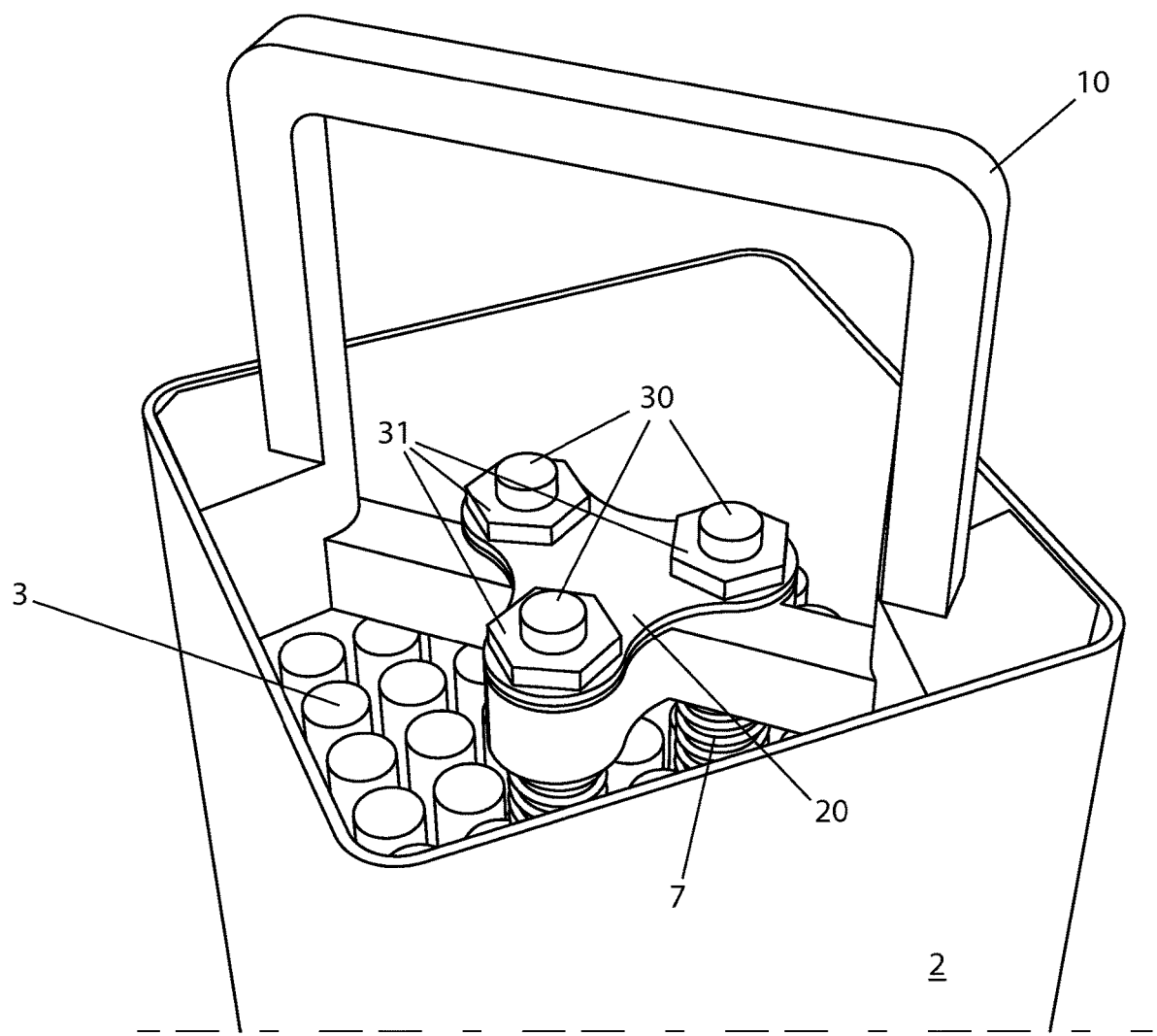
FIG. 7 illustrates a top section of a fuel assembly according to one embodiment, i.e. an alternative embodiment to the embodiment of FIG. 6.

FIGS. 6 and 7 illustrate the fuel assembly 1 in two embodiments. In the embodiment of FIG. 6, the handle 10 is secured to the channel 2 by means of bolts 17 and the channel 2 is lifted together with the water rods 30, spacers 6, tie plate 4 and the fuel rods 3 etc. The attachment of to the handle 10 to the channel 2 is provided by means of the bolts 17 but may also include springs (not illustrated) for pre-stressing the attachment, and allow a slight relative movement between the handle 10 and the channel 2. In FIG. 7, the handle 10 is not secured to the channel 2. The water rods 30, fuel rods 3, spacers 6, tie plate 4 etc. are lifted out of the channel 2 by means of the handle 10. The channel 2 may be provided with means for lifting (not illustrated) the channel 2, such as holes provided in two or more of the sides of the channel 2, whereby the channel 2 may be lifted, separately or simultaneously, as the fuel assembly 1.

A fuel assembly 1 for a boiling water reactor comprising fuel rods 3, two or three water rods 30, a tie plate 4, spacers 6, a handle 10, and a joint arrangement 11, 12, 13, 20-25, 31, 32, 33 has been described in embodiments. The joint arrangement 11-13, 20-25, 31-33 is configured to transfer a vertical lifting force from the handle 10 to the water rods 30. The joint arrangement 11-13, 20-25, 31-33 comprises a balancing element 20 arranged between the water rods 30 and the handle 10. The joint arrangement 11-13, 20-25, 31-33 comprises a first joint 13 arranged between the balancing element 20 and the handle 10 and a set of second joints 33 arranged between a respective one of said water rods 30 and said balancing element 20. The first joint 13 and the set of second joints 33 are configured to allow a rotational movement of said balancing element 20 in relation to said handle 10 as well as in relation to said water rods 30 in order to balance lifting forces in the water rods. The first joint 13 and each one of said second joints 33 comprise a pair of spherically rounded joint surfaces 11, 23; 25, 32.

The invention is, however, not limited to these embodiments, but may be varied in accordance with the scope of these embodiments and/or within the scope of the following claims.

What is claimed is:

1. A fuel assembly comprising:
   fuel rods;
   two or three water rods;
   a tie plate arranged for supporting said two or three water rods, wherein said two or three water rods are secured to the tie plate;
   one or more spacers configured to support said fuel rods and said two or three water rods;
   a handle secured to the water rods at a respective top end of each of the water rods, and
   a joint arrangement,
   wherein the handle is secured to said two or three water rods by means of the joint arrangement, said joint arrangement being configured to transfer a vertical lifting force from the handle to said two or three water rods;
   said joint arrangement comprises:
   a balancing element arranged between said two or three water rods and the handle; wherein said joint arrangement further comprises:
   a first joint arranged between the balancing element and the handle;
   a set of second joints, where each second joint of the set of second joints is arranged between a respective one of said two or three water rods and said balancing element; wherein
   said first joint and said set of second joints are configured to allow a rotational movement of said balancing element in relation to said handle as well as in relation to said two or three water rods, and wherein
   said first joint and each one of said second joints comprise a pair of spherically rounded joint surfaces.

2. A fuel assembly according to claim 1, wherein said first joint is centrally arranged in relation to the second joints.

3. A fuel assembly according to claim 1, wherein said pair of spherically rounded joint surfaces of said first joint comprises one spherically rounded joint surface on the handle and one spherically rounded joint surface on the balancing element, and wherein the spherically rounded joint surfaces of said pair of spherically rounded joint surfaces of the first joint are arranged in contact with each other.

4. A fuel assembly according to claim 1, said first joint comprising distance means configured to provide a clearance for rotation of the balancing element in relation to the handle.

5. A fuel assembly according to claim 1, wherein a respective fastener is secured to the top portion of each water rod and wherein each of said pairs of spherically rounded joint surfaces of said second joints comprises one spherically rounded joint surface on the fastener and one spherically rounded surface on the balancing element, so that the balancing element comprises one spherically rounded joint surface for each fastener, and wherein the spherically rounded joint surfaces of each of said pairs of spherically rounded joint surfaces of the set of second joints are arranged in contact with each other.

6. A fuel assembly according to claim 5, wherein each respective fastener comprises a nut, wherein a bottom side of each nut comprises a respective one of the spherically rounded joint surfaces of the set of second joints.

7. A fuel assembly according to claim 1, wherein said balancing element comprises two or three through-going holes, wherein each one of said two or three water rods extends through one of the through-going holes so that one water rod extends through each through-going hole, and wherein each of said through-going holes is configured with an internal diameter that provides a clearance for the respective water rod thereby allowing rotational movement of the balancing element in relation to each water rod.

8. A fuel assembly according to claim 1, wherein the number of said two or three water rods are three.

9. A fuel assembly according to claim 1, wherein the number of said two or three water rods are two.

10. A fuel assembly according to claim 1, wherein the balancing element consists of a single element, said single element being provided with said spherically rounded surface of the first joint on its bottom side, and being provided with said spherically rounded surfaces of the second joint on its top side.

11. A fuel assembly according to claim 10, wherein said single element is a plate-like element.

12. A fuel assembly according to claim 1, wherein said balancing element is arranged to rotate upon experiencing mutually different vertical forces from the water rods during lifting.

13. A fuel assembly according to claim 1, configured to be arranged inside a channel and wherein the tie plate, the spacer, the fuel rods and the water rods are configured for being lifted out of the channel.

14. A fuel assembly according to claim 1, further comprising a channel, wherein the handle is attached to the channel and wherein the tie plate, the spacer, the fuel rods and the water rods are configured for being lifted together with the channel.

* * * * *